US009963786B2

(12) United States Patent
Bammel et al.

(10) Patent No.: US 9,963,786 B2
(45) Date of Patent: May 8, 2018

(54) INORGANIC COMPOSITE COATINGS COMPRISING NOVEL FUNCTIONALIZED ACRYLICS

(71) Applicant: HENKEL AG & CO. KGAA, Duesseldorf (DE)

(72) Inventors: Brian D. Bammel, Rochester Hills, MI (US); John D. McGee, Troy, MI (US); Gregory T. Donaldson, Sterling Heights, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 255 days.

(21) Appl. No.: 13/833,675

(22) Filed: Mar. 15, 2013

(65) Prior Publication Data
US 2014/0272433 A1 Sep. 18, 2014

(51) Int. Cl.
C23C 18/12 (2006.01)
C09D 133/10 (2006.01)
C09D 133/12 (2006.01)
C08F 220/14 (2006.01)
C09D 5/08 (2006.01)
C09D 139/04 (2006.01)
C09D 7/12 (2006.01)
C08K 5/5415 (2006.01)

(52) U.S. Cl.
CPC ........ C23C 18/1241 (2013.01); C08F 220/14 (2013.01); C09D 5/08 (2013.01); C09D 5/082 (2013.01); C09D 7/1233 (2013.01); C09D 133/10 (2013.01); C09D 133/12 (2013.01); C09D 139/04 (2013.01); C08K 5/5415 (2013.01); Y10T 428/31663 (2015.04)

(58) Field of Classification Search
CPC .................. C08F 220/14; C08F 212/08; C08F 2220/1825; C08F 2220/1858; C08F 226/06; C08F 228/06; C08K 2003/3045; C08K 5/541; C08K 5/5415; C09D 133/12; C09D 139/04; C09D 133/10; C09D 5/08; C09D 5/082; C09D 7/1233; C23C 18/1241; Y10T 428/31663
USPC .......................... 428/400, 410, 420, 430, 440
See application file for complete search history.

(56) References Cited

U.S. PATENT DOCUMENTS

| 3,696,503 | A | * | 10/1972 | Krengel et al. ............... 29/527.4 |
| 4,645,810 | A | * | 2/1987 | Fischer ..................... C09J 4/00 525/259 |
| 5,278,249 | A | | 1/1994 | Marrion |
| 5,368,887 | A | * | 11/1994 | Hoshino ................. C03C 1/008 427/226 |
| 6,117,492 | A | | 9/2000 | Goldstein et al. |
| 6,165,969 | A | | 12/2000 | Boeckh et al. |
| 6,228,283 | B1 | | 5/2001 | Turcotte et al. |
| 6,706,835 | B2 | * | 3/2004 | Musa ............................ 526/262 |
| 6,713,559 | B1 | | 3/2004 | Armbrust et al. |
| 6,736,908 | B2 | | 5/2004 | Sako et al. |
| 6,942,899 | B2 | | 9/2005 | Kendig et al. |
| 8,241,524 | B2 | | 8/2012 | McGee et al. |
| 2003/0063998 | A1 | | 4/2003 | Ghosh et al. |
| 2003/0063999 | A1 | | 4/2003 | Ghosh et al. |
| 2003/0213533 | A1 | | 11/2003 | Sako et al. |
| 2004/0043161 | A1 | * | 3/2004 | Sepeur et al. ................ 427/551 |
| 2004/0227124 | A1 | | 11/2004 | Turcotte et al. |
| 2005/0061680 | A1 | * | 3/2005 | Dolan .......................... 205/322 |
| 2005/0163933 | A1 | | 7/2005 | Dietsche et al. |
| 2005/0176851 | A1 | | 8/2005 | Cook |
| 2006/0113509 | A1 | | 6/2006 | Norenberg et al. |
| 2006/0162820 | A1 | | 7/2006 | Dietsche et al. |
| 2007/0176149 | A1 | | 8/2007 | Dietsche et al. |
| 2007/0240792 | A1 | | 10/2007 | Witteler et al. |
| 2008/0171211 | A1 | | 7/2008 | Plieth et al. |
| 2008/0216705 | A1 | | 9/2008 | Hayes et al. |
| 2008/0226928 | A1 | | 9/2008 | Tanaka et al. |
| 2008/0230395 | A1 | | 9/2008 | Inbe et al. |
| 2008/0260959 | A1 | | 10/2008 | Gonzalez et al. |
| 2009/0078153 | A1 | | 3/2009 | Shchukin et al. |
| 2009/0148711 | A1 | * | 6/2009 | Le Blanc et al. ............. 428/447 |
| 2010/0159144 | A1 | | 6/2010 | Standke et al. |
| 2010/0291307 | A1 | * | 11/2010 | McGee et al. ............. 427/388.1 |
| 2011/0114225 | A1 | | 5/2011 | Bammel et al. |
| 2011/0244695 | A1 | | 10/2011 | Gvishi |

FOREIGN PATENT DOCUMENTS

| CN | 1082082 A | 2/1994 |
| CN | 1522289 A | 8/2004 |
| DE | 102005023728 A1 | 11/2006 |
| DE | 102007012406 A1 | 9/2008 |
| EP | 0581466 A2 | 2/1994 |
| EP | 0937757 A1 | 8/1999 |
| JP | 8231856 A | 9/1996 |
| JP | 2000309714 A | 11/2000 |
| JP | 2008253985 A | 10/2008 |
| JP | 2001329379 A | 11/2011 |
| KR | 20010062515 A | 7/2001 |
| WO | 2006076457 A1 | 7/2006 |
| WO | 2009004684 A1 | 1/2009 |
| WO | 2009143110 A1 | 11/2009 |
| WO | 2009143144 A1 | 11/2009 |

(Continued)

OTHER PUBLICATIONS

International Search Report for PCT/US2010/035087, 1 page.
European Search Report for 10778196.5, 1 page.
Supplemental European Search Report for 10778196.5, 1 page.
Dow Corning Corporation Material Safety Data Sheet, dated Nov. 16, 2010, Dow Corning Z-6020(R) Silane.

(Continued)

Primary Examiner — Michael B Nelson
(74) Attorney, Agent, or Firm — Mary K. Cameron

(57) ABSTRACT

Disclosed is a sol-gel coating composition comprising: one or more silane hydrolysis promoting acids; at least one silanol precursor; and an acrylic-based co-polymer comprising nitrogen-containing organic functional groups, and methods of making and using same, as well as metals coated using the compositions.

28 Claims, No Drawings

(56) References Cited

FOREIGN PATENT DOCUMENTS

| WO | 2010046001 A1 | 4/2010 |
|---|---|---|
| WO | 2010088946 A1 | 8/2010 |
| WO | 2010146001 A1 | 12/2010 |

OTHER PUBLICATIONS

Ono S., et al, "Improvement of Corrosion Resistance of Metals by an Environmentally Friendly Silica Coating Method", Journal of Sol-Gel Science and Technology, Springer, New York, NY, US vol. 29, No. 3, Mar. 1, 2004, pp. 147-153, XP001199932. Cited in International Search Report for PCT/IB2014/000978.

Khramov A.N., et al, "Sal-gel-derived corrosion-protective coatings with controllable release of incorporated organic corrosion inhibitors", Thin Solid Films, Elsevier-Sequoia S.A. Lausanne, Switzerland, vol. 483, No. 1-2, Jul. 1, 2015, pp. 191-196, XP027865506. Cited in International Search Report for PCT/IB2014/000978.

M. L. Zheludkevich, et al, "Sol-gel coatings for corrosion protection of metals", Journal of Materials Chemistry, vol. 15, No. 48, Jan. 1, 2005, p. 5099, XP055148262. Cited in International Search Report for PCT/IB2014/000978.

International Search Report for PCT/IB2014/00978, dated Nov. 4, 2014. All references cited in the International Search Report are listed herein, or were previously made of record.

International Search Report for PCT/US2009/044497, dated Sep. 2, 2009. All references cited in the International Search Report are listed herein.

\* cited by examiner

INORGANIC COMPOSITE COATINGS COMPRISING NOVEL FUNCTIONALIZED ACRYLICS

RELATED APPLICATIONS

None.

STATEMENT REGARDING FEDERALLY SPONSORED RESEARCH

None

FIELD OF THE INVENTION

This invention relates generally to anti-corrosion protective coatings and, more particularly, to anti-corrosion protective coating compositions that are sol-gel compositions comprising one or more silanol precursors, a silane hydrolysis promoting acid and an acrylic-based co-polymer comprising nitrogen-containing organic functional groups and methods of making and using same, as well as metals coated using the compositions.

BACKGROUND OF THE INVENTION

Untreated metal surfaces are subject to corrosion which can lead to rust development, weakening, discoloration and failure of the surface. Thus metal substrates are typically treated by a variety of methods to make the surface less reactive and more corrosion resistant. In addition, metal surfaces are often subsequently coated with decorative or additional protective coatings such as resin coatings, primers, paints and other surface treatments.

One common mechanism of corrosion occurs galvanically when atmospheric oxygen oxidizes the metal of a metal substrate. The transfer of electrons from the metal to the oxygen at electrocatalytic sites leads to formation of various metal oxide corrosion products. A variety of treatments can be used to prevent corrosion of metal surfaces such as cold rolled steel, hot rolled steel, zinc, aluminum, and alloys thereof, zinc- and zinc alloy-coated steel, as well as aluminum- and aluminum alloy-coated steel. These treatments include temporary oil-based rust preventatives, phosphate conversion coatings, inorganic and organic passivates, paints, and combinations thereof.

Temporary oil-based rust preventatives are used to provide short-term corrosion protection with ease of removal. They are not desirable for medium- or long-term corrosion protection alone, and when combined with other coatings make the surfaces unpaintable and by the nature of their handling are not suitable for a final consumer product.

Phosphate conversion coatings provide better corrosion protection and paintability, but require quite acidic conditions to operate, which is not desirable due to difficulty in handling the application chemicals, more troublesome waste treatment due to sludge generation, and extra wear on equipment. Such conversion coatings typically require subsequent treatments for maximum benefit.

Inorganic and organic passivates, such as those commonly applied to metal coil stock, provide a high degree of corrosion protection but possess several drawbacks. Many such products either contain chromium, are highly acidic, or both. Chromium-containing coatings and passivates are not desirable due to negative environmental considerations and more troublesome waste treatment. Highly acidic treatments also tend to degrade processing equipment and pose concerns with worker exposure.

Another issue for coatings is the development of yellowing or a yellow hue in the coating after heat treatment of a coated substrate or other common treatments including exposure to alkaline cleaners, phosphating solutions or solvents.

It is highly desirable to create compositions that are effective corrosion protective coatings without these negative issues. Applicants have developed a sol-gel coating composition that reduces or eliminates one or more of the foregoing drawbacks.

SUMMARY

In general terms, this invention provides a sol-gel composition comprising at least one silane hydrolysis promoting acid, at least one silanol precursor component; an acrylic-based co-polymer comprising nitrogen-containing organic functional groups; and optionally one or more other components such as corrosion inhibitors or surfactants.

In one embodiment the present invention includes a sol-gel coating composition comprising: a) one or more silane hydrolysis promoting acids; b) at least one silanol precursor; and c) 10 to 35% by weight of an acrylic-based co-polymer comprising nitrogen-containing organic functional groups, based on the total weight of the sol-gel composition excluding the weight of water and solvents, optionally further comprising a source of vanadium.

In one embodiment the present invention includes nitrogen-containing organic functional groups present in an amount of about 0.5-15% by weight based on total weight of the acrylic-based co-polymer on a dry-solids basis.

In one embodiment the nitrogen-containing organic functional groups are organic functional groups comprising a nitrogen atom and at least one additional heteroatom selected from a second nitrogen atom, an oxygen atom and a sulfur atom. Desirably the nitrogen-containing organic functional groups comprise one or more of a thiourea, a thiazole, and an imidazole.

In one embodiment the at least one silanol precursor is selected from the group consisting of silicic acid esters, alkylalkoxysilanes, and organofunctionalsilanes. Desirably, wherein the at least one silanol precursor comprises at least one of tetraethylorthosilicate, methyltriethoxysilane, 3-glycidyloxypropyltriethoxysilane, and aminoethylaminopropyltrimethoxysilane.

In one embodiment the one or more silane hydrolysis promoting acids is present in an amount sufficient to hydrolyze component b); b) the at least one silanol precursor is present in an amount of about 55 to about 85 wt % by based on total weight of the sol-gel composition excluding solvent and water; and c) the acrylic-based co-polymer comprising nitrogen-containing organic functional groups is present in an amount of about 10 to about 25 wt % based on total weight of the sol-gel composition excluding solvent and water.

In one embodiment the nitrogen-containing organic functional groups are generally present on the acrylic-based co-polymer in an amount of preferably 1-10% by weight based on total weight of the nitrogen-containing organic functional group relative to total weight of the acrylic-based co-polymer on a dry solids basis.

In another embodiment the present invention includes methods of coating a metal surface comprising: a. optionally, cleaning a metal substrate having at least one metal surface, at least a portion of said surface optionally comprising a metal oxide chemically adhered thereto; b. contacting the at least one metal surface with a sol-gel coating composition according to a the invention; c. drying said sol-gel coating composition in place on the at least one metal surface, such that the sol-gel coating composition reacts with said metal surface thereby forming a chemically adhered organic-inorganic composite coating on the metal surface, comprising silicon-based polymer chains and acrylic-based polymer chains.

In one embodiment the metal oxide is present on the metal substrate, said metal substrate comprising aluminum or an alloy thereof and said metal oxide comprising titanium dioxide and/or zirconium dioxide.

In one embodiment the sol-gel coating composition is applied in a continuous process. Desirably the contacting step may immediately follow a galvanizing treatment and the metal surface contacted comprises galvanized metal.

In one embodiment during at least a portion of drying step c., the metal surface has a peak metal temperature ranging from about 40° C. to about 150° C.

In one embodiment the present invention includes a coated metal substrate comprising: a. at least one metal surface; b. deposited on and chemically adhered to said at least one metal surface an organic-inorganic composite coating comprising reaction products of the sol-gel composition with the metal surface and products of condensation of the sol-gel, optionally comprising vanadium.

In one embodiment the present invention includes an article of manufacture comprising the coated metal substrate coated with compositions and according to methods of the invention, said article of manufacture being selected from a component of a vehicle, an architectural element, a household appliance and an electronic device.

In one embodiment the present invention includes a sol-gel coating composition comprising: at least one silane hydrolysis promoting acid; at least one silanol precursor component desirably comprising an alkoxysilane, and preferably comprising one or more silanol precursors selected from the group consisting of tetraethylorthosilicate, methyltriethoxysilane, 3-glycidyloxypropyltriethoxysilane; and an acrylic-based co-polymer having at least one nitrogen-containing organic functional group selected from the group consisting of a thiourea, a thiazole, and an imidazole.

The nitrogen-containing organic functional groups on the acrylic-based co-polymer are present in an amount sufficient to provide improved corrosion resistance as compared to the same sol-gel coating including the acrylic-based co-polymer in the absence of the nitrogen-containing functional groups.

These and other features and advantages of this invention will become more apparent to those skilled in the art from the following detailed description.

Except in the claims and the operating examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Numerical ranges provided throughout the description and claims are meant to include all subset ranges, that is, it is intended that the range comprises all sub ranges found within the stated range, for example $C_{1-10}$ also discloses $C_{2-10}$, $C_{1-9}$ and $C_{3-7}$, and a range of 1-100 also discloses 1-99, 2-100, and 45-50. Also, throughout this description, unless expressly stated to the contrary: percent, "parts of", and ratio values are by weight; the term "polymer" includes "oligomer", "copolymer", "terpolymer", and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description or of generation in situ by chemical reactions specified in the description, and does not necessarily preclude other chemical interactions among the constituents of a mixture once mixed; specification of materials in ionic form additionally implies the presence of sufficient counterions to produce electrical neutrality for the composition as a whole (any counterions thus implicitly specified should preferably be selected from among other constituents explicitly specified in ionic form, to the extent possible; otherwise such counterions may be freely selected, except for avoiding counterions that act adversely to the objects of the invention); the term "paint" and all of its grammatical variations are intended to include any similar more specialized terms, such as "lacquer", "varnish", "electrophoretic paint", "top coat", "clear coat", "color coat", "radiation curable coating", or the like and their grammatical variations; and the term "mole" means "gram mole", and "mole" and its grammatical variations may be applied to elemental, ionic, and any other chemical species defined by number and type of atoms present, as well as to compounds with well defined molecules.

DETAILED DESCRIPTION

A sol-gel coating composition according to the invention comprises at least one silanol precursor component; an acrylic-based co-polymer comprising nitrogen-containing organic functional groups; at least one hydrolysis promoting acid capable of causing hydrolysis of the silanol precursor component; and optionally one or more other components such as corrosion inhibitors, surfactants and additives which find use in sol-gel coatings in general. "Silanol precursor component" as used herein is intended to describe precursor compositions which hydrolyze to form silanols in the sol-gel forming reaction, which compositions are be further described below.

The sol-gel compositions of the present invention can provide electrically conductive dried-in-place coatings and are especially useful for electronics applications. The inventive compositions are also useful for coating metal substrates used for appliances, architectural and other uses, especially for forming coatings over zinc and zinc alloy coated substrates.

Coating formulations described herein are sol-gel based coatings as the term is widely understood in the art. Such coatings can be prepared by combining silanol precursors, such as silanes, for example organosilanes, in water in the presence of a catalyst, such as acid, to produce silanols via a hydrolysis reaction. Silanols are subject to condensation to form oligomeric constituents, thereby generating a sol-gel.

As noted above, one component of the sol-gel is an acrylic-based co-polymer that includes nitrogen-containing organic functional groups. The acrylic-based co-polymer may be present in an amount of from 10 to 35% by weight based on the total weight of the sol-gel composition excluding the weight of water and solvents. The excluded weights include any water or solvents brought in with any of the other components.

"Acrylic" refers to a variety of ethylenically unsaturated monomers and co-monomers that may be co-polymerized to form the acrylic-based co-polymer. The resulting co-polymer may comprise a variety of methacrylate ester monomers, acrylate ester monomers, styrene and alpha-methylstyrene, acrylonitrile and methacrylonitrile monomers. Other co-monomers such as methylenebutyrolactone, vinylpyrrolidinone, chloroprene, vinyl acetate may also be incorporated in lesser amounts.

The acrylic-based co-polymer can include any polymerizable ethylenically unsaturated monomers such as acrylic acid, methacrylic acid, acrylate and (meth)acrylate monomers and often also includes vinyl monomers such as styrene. The term (meth)acrylate will be understood by those of skill in the art to be a generic term referring to acrylate and/or methacrylate. Examples of (meth)acrylate monomers that can be used, without limitation, include methacrylate, methyl methacrylate, 2 ethylhexyl acrylate, n-butyl methacrylate, hydroxyethyl methacrylate, acetoacetoxyethyl methacrylate, butyl acrylate, and other esters of acrylic acid and methacrylic acid. The co-monomers can also include acrylamide and derivatives such as acrylonitrile. Acrylamide and Acrylonitrile are not included within the group defined as monomers bearing nitrogen-containing organic functional groups. Nitrogens of these monomers are not included in any calculation of quantity of nitrogen-containing organic functional groups on the acrylic-based co-polymer according to the invention.

Nitrogen-containing organic functional groups may be imparted to an acrylic-based co-polymer in a number of ways. A monomer bearing a nitrogen-containing organic functional group may be polymerized directly. Especially preferred functional monomers are N-allyl-thiourea, 4-methyl-5-vinylthiazole and 1-vinyl-imidazole. Alternatively a nitrogen-containing organic functional group may result from a derivative reaction of a precursor functional group Z and the derivation can be carried out before, during, or after polymerization. Functional group Z can be introduced as an endgroup on a polymerizable monomer, or it can be introduced as an endgroup or pendant group on an oligomer such as a hydrophobe within a mini-emulsion polymerization.

In one embodiment, Z is either a substituted 1,2-dicarbonyl compound, or a primary amine and the nitrogen-containing organic functional group is an imidazole formed by reaction of the 1,2-dicarbonyl compound with ammonia and aldehyde to form an unsubstituted imidazole or reaction of a 1,2 dicarbonyl compound with a primary amine and ammonia, which is an adaptation of the Debus-Radziszewski imidazole synthesis, to form a substituted imidazole. In one embodiment an acrylic-based co-polymer comprising group Z is first prepared after which Z is converted to a nitrogen-containing organic functional in a subsequent derivation reaction.

The nitrogen-containing organic functional groups on the acrylic-based co-polymer may be any combination comprising carbon atoms and nitrogen atoms which provides improved corrosion resistance to the sol-gel coating. In one embodiment, the nitrogen-containing organic functional groups comprise a nitrogen atom and at least one additional heteroatom selected from a second nitrogen atom, an oxygen atom and a sulfur atom.

Particular improvements in performance were noted in sol-gel coating wherein the nitrogen-containing organic functional groups were selected from thioureas, thiazoles, and imidazoles. As used herein "thioureas", "thiazoles" and "imidazoles" will be understood by those of skill in the art to mean functional groups based on one of the chemical compounds thiourea, thiazole and imidazole and bonded to the acrylic-based polymer. Functional groups based on substituted thiourea, thiazole and imidazole compounds are also included in the meaning of these terms provided that these substituted functional groups do not unduly interfere with the objects of the invention.

The nitrogen-containing organic functional groups are generally present on the acrylic-based co-polymer in an amount of about 0.5 to 15%, preferably 1-10% and more preferably 2 to 6% by weight based on total weight of the nitrogen-containing organic functional group relative to total weight of the acrylic-based co-polymer on a dry solids basis. The combination of styrene, if included, acrylic monomer and nitrogen-containing organic functional groups may be chosen to form a co-polymer with a theoretical glass transition temperature (Tg) of from 0 to 50° C., more preferably from 20 to 40° C., and most preferably from 25 to 35° C.

Additional optional functional monomers that can be used in the co-polymer include components that are either reactive during drying of the coating or that promote adhesion to overcoats within multi-layered coating applications. Non-limiting examples of these components include monomers having silanol functional groups such as methacryloxypropyl-tris-(2-propoxy)silane; monomers having carboxyl groups bearing ethylenic unsaturation such as unsaturated di-acids like maleic acid, and itaconic acid and mono-esters of unsaturated di-acids like mono-butylitaconate. Methods for polymerization of acrylic-based co-polymers are well known in the art.

Polymerization initiators include conventional free radical initiators such as hydrogen peroxide; organic hydroperoxides such as t-butyl hydroperoxide, cumene hydroperoxide, t-amyl hydroperoxide; ammonium and/or alkali persulfates; organic peroxides such as t-butyl perpivalate, t-butyl perbenzoate, benzoyl peroxide, di(n-propyl) peroxydicarbonate, acetyl cyclo-hexylsulfonyl peroxide, and the like; typically these are used at levels of from 0.05 to 3.0% by weight based on the weight of total monomer. Redox systems using the same initiators coupled with a suitable reductant, for example: reducing sugars such as isoascorbic acid, sodium bisulfite, sodium thiosulfate, hydroxyl-amine, hydrazine, sodium hydrosulfite, and sodium formaldehyde sulfoxylate, can be used at similar levels. Often these are used in conjunction with a metal catalyst such as salts of transition metals, examples of which are iron sulfate, copper sulfate, vanadium sulfate, and the like. Additionally, non-oxidizing thermal initiators such as 2,2'-Azo-bis-isobutyronitrile, 4,4'-Azo-bis(4-cyanopentanoic acid), 2,2'-Azo-bis (2-amidinopropane) dihydrochloride, and the like can be used.

The sol-gel composition according to the present invention further includes use of a mixture of silanol precursors. A variety of silanes are useful in the present invention, as silanol precursors, suitable examples include alkoxysilanes such as silicic acid esters, alkylalkoxysilanes and organofunctional silanes. Organofunctional silanes can include epoxysilanes, mercaptosilanes and aminosilanes and the like.

Examples of silicic acid esters include tetramethoxysilane, tetraethoxysilane and tetrapropoxysilane and the like. Examples of alkylalkoxysilanes include methyltrimethoxysilane, methyltriethoxysilane, propyltrimethoxysilane and the like. Organofunctional silanes comprise alkoxysilanes with at least one functional group such as epoxy or mercaptan; glycidylpropyltriethoxysilane and mercaptopropyltrimethoxysilane are two unlimiting representative examples.

Examples of suitable alkoxysilanes include tetramethoxysilane, methyltrimethoxysilane, propyltrimethoxysilane, isopropyltrimethoxysilane, octyltrimethoxysilane, hexadecyltrimethoxysilane, octadecyltrimethoxysilane, tetraethoxysilane, methyltriethoxysilane, propyltriethoxysilane, isopropyltriethoxysilane, octyltriethoxysilane, hexadecyltriethoxysilane, and octadecyltriethoxysilane.

Examples of suitable organosilanes include 3-aminopropyltrimethoxysilane, 3-aminopropyl-triethoxysilane, N-(2-aminoethyl)-3-aminopropyltrimethoxysilane, N-(2-aminoethyl)-3-aminopropyltriethoxysilane, N-(2-aminoethyl)-3-aminopropyl-methyldimethoxysilane, N-(2-aminoethyl)-3-aminopropyl-methyldiethoxysilane, N,N-di(2-aminoethyl)-3-aminopropyltrimethoxysilane, N,N-di(2-aminoethyl)-3-aminopropyltriethoxysilane, N-[N'-(2-aminoethyl)]-3-aminopropyltrimethoxysilane, N-[N'-(2-aminoethyl)-2-aminoethyl)]-3-aminopropyltriethoxysilane, N-methyl-3-aminopropyltrimethoxysilane, N-methyl-3-aminopropyltriethoxysilane, N-(n-butyl)-3-aminopropyltrimethoxysilane, N-(n-butyl)-3-aminopropyltriethoxysilane, N-cyclohexyl-3-aminopropyltrimethoxysilane, N-cyclohexyl-3-aminopropyltriethoxysilane, N-phenyl-3-aminopropyltrimethoxysilane, 3-aminopropylmethyldimethoxy-silane, 3-aminopropylmethyldiethoxysilane, bis(3-trimethoxysilylpropyl)amine, bis(3-triethoxysilylpropyl) amine and fluoro-functional organosilanes.

Examples of suitable aminosilanes include $H_2N—(CH_2)_3—Si(OCH_3)_3$ (AMMO) $H_2N—(CH_2)_3—Si(OC_2H_5)_3$ (AMEO) $H_2N—(CH_2)_2—NH—(CH_2)_3—Si(OCH_3)_3$ (DAMO) $H_2N—(CH_2)_2—NH—(CH_2)_3—Si(OC_2H_5)_3$ (DAEO) $H_2N—(CH_2)_2—NH—(CH_2)_2—NH—(CH_2)_3—Si(OCH_3)_3$ (TRIAMO) $(OCH_3)_3Si—(CH_2)_3—NH—(CH_2)_3—Si(OCH_3)_3$ (BisAMMO) $(OCH_3)_3Si—(CH_2)_3—NH—(CH_2)_3—Si(OC_2H_5)_3$ (BisAMEO) or aqueous solutions of the respective aforementioned aminoalkylsilanes or aminosiloxanes, especially aqueous aminosiloxane solutions based on at least one of the aforementioned aminoalkylsilanes, of the kind described in more detail later on below, i.e., in particular, aqueous solutions—which have been made basic—of the cocondensates of aminoalkoxysilanes and other organofunctional alkoxysilanes. Examples of the basic amine silanes catalysts include aminoethyl-triethoxysilane, beta-amino-ethyltrimethoxysilane, beta-aminoethyl-triethoxysilane, beta-amino-ethyl-tributoxysilane, beta-aminoethyltripropoxysilane, alpha-aminoethyl-trimethoxysilane, alpha-aminoethyl-triethoxysilane, gamma-aminopropyltrimethoxysilane, gamma-aminopropyl-triethoxysilane, gamma-aminopropyl-tributoxysilane, gamma-amino-propyltripropoxysilane, beta-aminopropyl-trimethoxysilane, beta-aminopropyl-triethoxysilane, beta-amino-propyltripropoxysilane, beta-aminopropyl-tributoxysilane, alpha-aminopropyl-trimethoxysilane, alpha-aminopropyltriethoxysilane, alpha-aminopropyl-tributoxysilane, alpha-aminopropyl-tripropoxysilane, N-aminomethylaminoethyl-trimethoxysilane, N-aminomethylaminomethyl-tripropoxysilane, N-aminomethyl-beta-aminoethyl-trimethoxysilane, N-aminomethyl-beta-aminoethyl-triethoxysilane, N-aminomethyl-beta-aminoethyl-tripropoxysilane, N-aminomethyl-gamma-aminopropyl-trimethoxysilane, N-aminomethyl-gamma-aminopropyl-triethoxysilane, N-aminomethyl-gamma-aminopropyl-tripropoxysilane, N-aminomethyl-beta-aminopropyl-trimethoxysilane, N-aminomethyl-beta-aminopropyl-triethoxysilane, N-aminomethyl-beta-aminopropyl-tripropoxysilane, N-aminopropyltripropoxysilane, N-aminopropyl-trimethoxysilane, N-(beta-aminoethyl)-beta-aminoethyl-trimethoxysilane, N-(beta-aminoethyl)-beta-aminoethyl-triethoxysilane, N-(beta-aminoethyl)-beta-aminoethyl-tripropoxysilane, N-(beta-aminoethyl)-beta-aminoethyl-trimethoxysilane, N-(beta-aminoethyl)-alpha-aminoethyl-triethoxysilane, N-(beta-aminoethyl)-alpha-aminoethyl-tripropoxysilane, N-(beta-aminoethyl)-beta-aminopropyl-trimethoxysilane, N-(beta-aminoethyl)-gamma-aminopropyl-triethoxysilane, N-(beta-aminoethyl)-gamma-aminopropyl-tripropoxysilane, N-(beta-aminoethyl)-gamma-aminopropyl-trimethoxysilane, N-(beta-aminoethyl)-beta-aminopropyl-triethoxysilane, N-(beta-aminoethyl)-beta-aminopropyl-tripropoxysilane, N-(gamma-aminopropyl)-beta-aminoethyl-trimethoxysilane, N-(gamma-aminopropyl)-beta-aminoethyl-triethoxysilane, N-(gamma-aminopropyl)-beta-aminoethyl-tripropoxysilane, N-methyl aminopropyl trimethoxysilane, beta-aminopropyl methyl diethoxysilane, gamma-diethylene triaminepropyltriethoxysilane, and the like.

As the epoxy silane, suitable materials include for example, glycidoxy($C_1$-$C_6$-alkyl)(tri-$C_1$-$C_3$ alkoxy)silane, such as, 3-glycidoxypropyltrimethoxysilane, 3-glycidoxypropyldiisopropylethoxysilane, (3-glycidoxypropyl)methyldiethoxysilane, 3-glycidoxypropyltriethoxysilane, and epoxy-functional silane compounds. Examples of suitable epoxy functional compounds include for example gamma-glycidyloxymethyltrimethoxysilane, gamma-glycidyloxymethyltriethoxysilane, gamma-glycidoxymethyl-tripropoxysilane, gamma-glycidoxymethyl-tributoxysilane, beta-glycidoxyethyltrimethoxysilane, beta-glycidoxyethyltriethoxysilane, beta-glycidoxyethyl-tripropoxysilane, beta-glycidoxyethyl-tributoxysilane, beta-glycidoxyethyltrimethoxysilane, alpha-glycidoxyethyl-triethoxysilane, alpha-glycidoxyethyl-tripropoxysilane, alpha-glycidoxyethyltributoxysilane, gamma-glycidoxypropyl-trimethoxysilane, gamma-glycidoxypropyl-triethoxysilane, gamma-glycidoxypropyl-tripropoxysilane, gamma-glycidoxypropyltributoxysilane, beta-glycidoxypropyl-trimethoxysilane, beta-glycidoxypropyl-triethoxysilane, beta-glycidoxypropyl-tripropoxysilane, beta-glycidoxypropyl-tributoxysilane, alpha-glycidoxypropyl-trimethoxysilane, alpha-glycidoxypropyl-triethoxysilane, alpha-glycidoxypropyl-tripropoxysilane, alpha-glycidoxypropyl-tributoxysilane, gamma-glycidoxybutyl-trimethoxysilane, delta-glycidoxybutyl-triethoxysilane, delta-glycidoxybutyl-tripropoxysilane, delta-glycidoxybutyl-tributoxysilane, delta-glycidoxybutyl-trimethoxysilane, gamma-glycidoxybutyl-triethoxysilane, gamma-glycidoxybutyl-tripropoxysilane, gamma-alpropoxybutyl-tributoxysilane, delta-glycidoxybutyl-trimethoxysilane, delta-glycidoxybutyl-triethoxysilane, delta-glycidoxybutyl-tripropoxysilane, alpha-glycidoxybutyl-trimethoxysilane, alpha-glycidoxybutyl-triethoxysilane, alpha-glycidoxybutyl-tripropoxysilane, alpha-glycidoxybutyl-tributoxysilane, (3,4-epoxycyclohexyl)-methyl-trimethoxysilane, (3,4-epoxycyclohexyl)methyl-triethoxysilane, (3,4-epoxycyclohexyl)methyl-tripropoxysilane, (3,4-epoxycyclohexyl)-methyl-tributoxysilane, (3,4-epoxycyclohexyl)ethyl-trimethoxysilane, (3,4-epoxycyclohexyl)ethyl-triethoxysilane, (3,4-epoxycyclohexyl)ethyl-tripropoxysilane, (3,4-epoxycyclohexyl)-ethyl-tributoxysilane, (3,4-epoxycyclohexyl)propyl-trimethoxysilane, (3,4-epoxycyclohexyl)propyl-triethoxysilane, (3,4-epoxycyclohexyl)propyl-tripropoxysilane, (3,4-epoxycyclohexyl)propyl-tributoxysilane, (3,4-epoxycyclohexyl)butyl-trimethoxysilane, (3,4-epoxycyclohexyl)butyl-triethoxysilane, (3,4-epoxycyclohexyl)butyl-tripropoxysilane, (3,4-epoxycyclohexyl)butyl-tributoxysilane.

Desirably the silanol precursors include tetraethylorthosilicate (TEOS), methyltriethoxysilane (MTES), 3-glycidyloxypropyltriethoxysilane, and additional alkoxysilanes.

The silanol precursors are preferably present in an amount of from 55 to 85% by weight based on the total weight of the sol-gel composition excluding the weight of water and solvents. The excluded weights include any water or solvents brought in with any of the other components. The sol-gel is formed by combining the silanol precursors with a silane hydrolysis promoting acid. In making sol-gel coating compositions according to the invention it is desirable to combine the acrylic-based co-polymer, described above, with at least one silanol precursor in the presence of a silane hydrolysis promoting acid with stirring to form the final sol-gel coating composition.

At least one hydrolysis promoting acid capable of causing hydrolysis of the silanol precursor component is desirable for forming the sol-gel coating composition. Hydrolysis promoting acids include any organic or inorganic acid capable of hydrolyzing the aforedescribed silanes to form silanols which do not interfere with the formation or performance of the coating. Examples of preferred acids include acetic acid, phosphoric acid, fluoroacids such as fluorzirconic acid and fluorotitanic acid.

The other components forming the sol-gel include acids used to promote hydrolysis of the silanol precursors and optionally surfactants and/or corrosion inhibitors. Preferably these other components comprise from 5 to 20% by weight based on the total weight of the sol-gel composition excluding the weight of water and solvents. The excluded weights include any water or solvents brought in with any of the other components.

Other materials which can be incorporated during formation of the sol-gel include inorganic nanoparticles, such as $SiO_2$ based nanoparticles, additional polymer dispersions or emulsions, surfactants, co-solvents, and other additives.

The surfactants can include anionic, nonionic, amphoteric surfactants and mixtures thereof. Non-limiting representative classes of anionic surfactants include alkyl sulfates, alkyl and alkylaryl ether sulfates, sulfonates, and phosphate esters. Nonionic surfactants include but are not limited to ethoxylated alcohols and ethoxylated amides. Representative non-limiting examples of amphoteric surfactants include imidazoline based surfactants with di-sodium cocoamphodipriopionate as one preferred example. Preferred levels of active nonionic surfactants are from 1 to 6% by weight based on total monomer weight. Preferred levels of active anionic surfactants are from 0.25 to 2.0% by weight based on the total monomer weight. Preferred levels of active amphoteric surfactant are from 1 to 4% by weight based on total monomer weight.

Other additives may include corrosion inhibitors such as vanadium containing compounds such as vanadium sulfate, molybdates, or chromium compounds, preferably in the absence of hexavalent chromium, in the sol-gel composition. When used the corrosion inhibitors are added to the mixture of silanol precursors and acrylic-based co-polymer.

The present invention provides a high level of corrosion resistance and yellowing resistance when deposited on bare metal surfaces. "Bare metal" means a metal surface in the absence of pre-treatment chemicals, such as metal phosphating solutions, chromium-containing rinses, or other passivating treatments or reaction products of the pre-treatment chemicals with other substances or each other. Typical bare metal surfaces comprise metals of the substrate in a zero oxidation state, and sometimes these zero oxidation state metals are covered at least partially by native oxides of metals from the substrate that have been oxidized, often by oxygen from the air.

Alternatively sol-gel compositions may also be used over conventional pretreatments. In one embodiment, the sol-gel is applied over an electrolytically deposited oxide coating, for example titanium dioxide or zirconium oxide, chemically adhered to an underlying metal surface, for example aluminum or aluminum alloys.

The sol-gel coating composition is suitable for application to a variety of substrates including ferrous metal, for example steels including cold rolled steel, hot rolled steel, and stainless steel; aluminum and alloys thereof; zinc and alloys thereof; steel coated with zinc, aluminum, zinc alloys or aluminum alloys, for example electrogalvanized steel, GALVALUME®, GALVANNEAL®, hot-dipped galvanized steel. The present invention is preferred for use on steel coated with zinc, aluminum, zinc alloys or aluminum alloys, for example hot dipped galvanized steel and electrogalvanized steels.

The metal surface may be cleaned prior to application of a sol-gel coating composition according to the invention. In some applications, such as a galvanizing line within a mill, the sol-gel coating may be applied in a continuous fashion following the galvanizing step such that no separate cleaning operation is required. In other applications, a cleaning step prior to application of a sol-gel coating composition may be used to remove contaminants such as soils or oils. Cleaning of metal surfaces is known in the art and can include mild or strongly alkaline and/or acidic cleaners. Examples of cleaners include PARCO® CLEANER ZX-1 and PARCO® CLEANER 315, both commercially available from Henkel Corporation. Following any cleaning step, the cleaned metal surface may be rinsed with water prior to treatment according to the present invention. The compositions of the invention are then applied to metal surfaces and dried in place to form thin, adherent protective coatings.

Methods for applying dry in place sol-gel coating compositions of the present invention include dry in place coating methods, spray application, roll coating, dip or bath coating, drawbar coating and the like. Drying may be achieved under any number of conditions including room temperature of 10-30° C. Application of heat is generally preferred to reduce drying time. Heat may be provided at least partially by a warm substrate or by passing through heating zones, such as ovens. In one embodiment, the composition is applied by roll coating or draw bar coating.

The sol-gel coating compositions of the present invention are preferably applied to provide a dried in place amount of from 70 to 600 milligrams per square foot; more preferably at a level of from 80 to 300 milligrams per square foot; and most preferably at a level of from 80 to 200 milligrams per square foot. The applied coatings can be dried in place using a peak metal temperature of from 43° C. to 150° C.; more preferably from 70° C. to 130° C.; and most preferably from 90° C. to 110° C. One of the issues facing use of coating compositions is that often the coatings show yellowing especially after heat treatments. The present coating compositions reduce this tendency for yellowing.

EXAMPLES

Three functionalized acrylic-based co-polymer emulsions were prepared in accordance with the present invention, in addition a non-functionalized acrylic-based co-polymer emulsion was created as a control. The formulas are provided below in Table 1 in terms of grams of component added.

Parts A and A1 were added to a 1 liter flask equipped with stirrer and nitrogen inlet and heated to 70° C. Pre-emulsion B was prepared as follows. Part B1 components were mixed to a clear solution. Part B2 components were combined and mixed. Part B1 was added to part B2 with mixing to form a uniform pre-emulsion B. The components of parts C1, C2, D1, and D2 were all mixed separately to form uniform solutions. At 70° C., 5% of pre-emulsion B, 25% of part C1 and 25% of part C2 were added to the flask. After 20 minutes, the remainder of pre-emulsion B, the remainder of part C1 and the remainder of part C2 were added at a uniform rate over 3 hours to the flask. Upon completion of these additions, the deionized water flush was run through the pre-emulsion pump into the flask. Then, parts D1 and D2 were added at a uniform rate over 30 minutes to the flask. Upon completion of the additions, the flask was maintained at 70° C. for one additional hour and then cooled to room temperature.

TABLE 1

| Part | Component | Thiourea Functionalized Acrylic-based Co-polymer Emulsion 1 | Thiazole Functionalized Acrylic-based Co-polymer Emulsion 2 | Imidazole Functionalized Acrylic-based Co-polymer Emulsion 3 | Control Non-functionalized Acrylic-based Co-polymer Emulsion 4 |
|---|---|---|---|---|---|
| A | Deionized Water | 243.0 | 243.0 | 297.5 | 277.5 |
|  | Ammonium lauryl sulfate (27% active) | 2.0 | 2.0 | 2.3 | 2.3 |
| A1 | 0.5% Ferrous Sulfate | 2.0 | 2.0 | 2.4 | 2.4 |
| B1 | Deionized Water | 86.0 | 86.0 | 101.2 | 101.2 |
|  | Ammonium lauryl sulfate (27% active) | 2.0 | 2.0 | 2.3 | 2.3 |
|  | Ethoxylated $C_{12}$-$C_{14}$ Secondary alcohol (80%) | 13.4 | 13.4 | 15.9 | 15.9 |
| B2 | n-Butyl Methacrylate | 51.6 | 51.6 | 91.2 | 114.2 |
|  | Styrene | 56.7 | 56.7 | 60.8 | 45.6 |
|  | Methyl Methacrylate | 72.2 | 72.2 | 79.0 | 83.5 |
|  | 2-Ethylhexyl Acrylate | 64.4 | 64.4 | 65.4 | 60.8 |
|  | N-Allyl-Thiourea | 12.9 | — | — | — |
|  | 4-Methyl-5-Vinylthiazole | — | 12.9 | — | — |
|  | 1-Vinyl Imidazole | — | — | 7.6 | — |
| C1 | Deionized Water | 10.6 | 10.6 | 10.4 | 20.4 |
|  | t-Butyl Hydroperoxide 70% | 1.40 | 1.40 | 1.6 | 1.6 |
| C2 | Deionized Water | 11.1 | 11.1 | 10.9 | 20.9 |
|  | Sodium Formaldehyde Sulfoxylate | 0.93 | 0.93 | 1.1 | 1.1 |
| D1 | Deionized Water | 9.6 | 9.6 | 11.6 | 11.6 |
|  | t-Butyl Hydroperoxide 70% | 0.34 | 0.34 | 0.40 | 0.4 |
| D2 | Deionized Water | 9.8 | 9.8 | 11.7 | 11.7 |
|  | Sodium Formaldehyde Sulfoxylate | 0.25 | 0.25 | .30 | .30 |
| Flush | Deionized Water | 21.0 | 18.8 | 21.2 | 20.4 |
|  | Theoretical Tg | 29.6 | 29.6 | 29.0 | 29.0 |
|  | pH | 6.01 | 3.37 | 7.03 | 2.70 |
|  | % non-volatile solids | 37.50 | 40.40 | 39.81 | 39.75 |

Each of the Table 1 emulsions was then added to a separate container holding a mixture of silanol precursors and acid that had been combined and allowed to begin hydrolyzing thereby forming a total of eight sol-gel coating compositions. Vanadium sulfate was subsequently added to four of the compositions. The formulas for the sol-gel coating compositions without vanadium sulfate are provided below in Table 2, and the sol-gel coating compositions with vanadium sulfate are provided below in Table 3, all amounts are in grams of component added.

The coating compositions without vanadium sulfate were formed as follows: Mixture 1 components were combined and stirred at 750 rpm for 20 minutes. Components of Mixture 2 were combined and swirled together to mix them. Mixture 2 was then added to Mixture 1, stirring rate was increased to 900 rpm and mixing was continued for 6 hours. After the 6 hours, Mixture 3 was added to the Mixture 1/Mixture 2 combination with continued stirring. The coating compositions with vanadium sulfate were made in the same manner with Mixture 4 added after Mixture 3.

TABLE 2

| Component | Sol-Gel Composition containing Thiourea Functionalized Acrylic-based Co-polymer | Sol-Gel Composition containing Thiazole Functionalized Acrylic-based Co-polymer | Sol-Gel Composition containing Imidazole Functionalized Acrylic-based Co-polymer | CONTROL Sol-Gel Composition |
|---|---|---|---|---|
| Mix 1 | | | | |
| Silane #1 | 3.2 | 3.2 | 3.2 | 3.2 |
| Phosphoric acid (75%) | 3.5 | 3.5 | 3.5 | 3.5 |
| Deionized water | 67.7 | 68.7 | 68.5 | 68.5 |
| Mix 2 | | | | |
| Tetraethoxy Silane | 1.6 | 1.6 | 1.6 | 1.6 |
| Methyl triethoxysilane | 5.6 | 5.6 | 5.6 | 5.6 |
| Silane #2 | 4.7 | 4.7 | 4.7 | 4.7 |
| Mix 3 | | | | |
| Acrylic-based Co-polymer Emulsions from Table 1 | 13.7 | 12.7 | 12.9 | 12.9 |

Silane #1 is a commercially available silane mixture which is described by the manufacturer as containing the following silanes: 70-90% aminoethylaminopropyltrimethoxysilane and 3-7% methoxysilane.
Silane #2 was a 3-glycidyloxypropyltriethoxysilane.

TABLE 3

| Component | Sol-Gel Composition containing Thiourea Functionalized Acrylic-based Co-polymer plus VOSO$_4$ | Sol-Gel Composition containing Thiazole Functionalized Acrylic-based Co-polymer plus VOSO$_4$ | Sol-Gel Composition containing Imidazole Functionalized Acrylic-based Co-polymer plus VOSO$_4$ | CONTROL Sol-Gel Composition plus VOSO$_4$ |
|---|---|---|---|---|
| Mix 1 | | | | |
| Silane #1 | 3.2 | 3.2 | 3.2 | 3.2 |
| Phosphoric acid (75%) | 3.5 | 3.5 | 3.5 | 3.5 |
| Deionized water | 50.0 | 50.0 | 50.0 | 50.0 |
| Mix 2 | | | | |
| Tetraethoxy Silane | 1.6 | 1.6 | 1.6 | 1.6 |
| Methyl triethoxysilane | 5.6 | 5.6 | 5.6 | 5.6 |
| Silane #2 | 4.7 | 4.7 | 4.7 | 4.7 |
| Mix 3 | | | | |
| Acrylic-based Co-polymer Emulsions from Table 1 | 13.7 | 12.7 | 12.9 | 12.9 |
| Mix 4 | | | | |
| Deionized Water | 17.7 | 18.7 | 18.5 | 18.5 |
| VOSO$_4$ | .95 | .95 | .95 | .95 |

TABLE 4

| Sol-Gel Composition | Weight % co-polymer | Weight % silanol precursors | Weight % other |
|---|---|---|---|
| Sol-Gel Composition containing Thiourea Functionalized Acrylic-based Co-polymer | 22.3 | 66.2 | 11.5 |
| Sol-Gel Composition containing Thiazole Functionalized Acrylic-based Co-polymer | 22.3 | 66.2 | 11.5 |
| Sol-Gel Composition containing Imidazole Functionalized Acrylic-based Co-polymer | 22.3 | 66.2 | 11.5 |
| CONTROL Sol-Gel Coating | 22.3 | 66.2 | 11.5 |
| Sol-Gel Composition containing Thiourea Functionalized Acrylic-based Co-polymer plus $VOSO_4$ | 21.5 | 63.6 | 14.9 |
| Sol-Gel Composition containing Thiazole Functionalized Acrylic-based Co-polymer plus $VOSO_4$ | 21.5 | 63.6 | 14.9 |
| Sol-Gel Composition containing Imidazole Functionalized Acrylic-based Co-polymer plus $VOSO_4$ | 21.5 | 63.6 | 14.9 |
| CONTROL Sol-Gel Coating plus $VOSO_4$ | 21.5 | 63.6 | 14.9 |

The sol-gel coating compositions from Tables 2 and 3 were coated onto commercially available hot dipped galvanized steel test panels (HDG) using a drawbar application at a dried coating amount of 80 milligrams per square foot. The sample panels were first hand wash cleaned with the metal cleaner RIDOLINE® 1559 at a level of 5% at room temperature followed by two tap water rinses. The cleaner is available from Henkel Corporation. The coating compositions were dried in place using a peak metal temperature of 93.3° C. The coated panels were then subjected to a variety of tests.

In a first testing protocol, duplicate panels were subjected to a neutral salt spray (NSS) test according to ASTM B117-03. Two panels of each composition were tested and were visually rated for visible face-rust (expressed as a percentage of coated surface) at 24 hour intervals. Ratings were made until the extent of race-rust for all panels within the set exceeded 10%. The results for an average of the two panels of each condition are presented below in Table 5 in terms of % facerust at the selected time points for the panels. The results clearly show the advantage of the functionalized acrylic-based co-polymers over the control acrylic-based co-polymer in terms of extending the corrosion protection time in the test. The results also show that the addition of vanadium sulfate causes a large increase in the corrosion protection of the coating composition, even in non-functionalized acrylic-based co-polymer tests. In the coating compositions prepared according to the present invention the addition of vanadium sulfate dramatically increases the life of the panels in the NSS test.

TABLE 5a

Without $VOSO_4$

| Coating composition | 24 hours | 48 hours | 72 hours | 96 hours |
|---|---|---|---|---|
| Sol-Gel Composition containing Thiourea Functionalized Acrylic-based Co-polymer | 0.0 | 0.0 | 4 | 12.5 |
| Sol-Gel Composition containing Thiazole Functionalized Acrylic-based Co-polymer | 0.0 | 0.5 | 20.0 | 60.0 |
| Sol-Gel Composition containing Imidazole Functionalized Acrylic-based Co-polymer | 0.0 | 1.0 | 35.0 | 70 |
| Control | 5 | 55 | 60 | 90 |

TABLE 5b

With $VOSO_4$

| Coating composition | 24 hours | 48 hours | 72 hours | 96 hours | 168 hours |
|---|---|---|---|---|---|
| Sol-Gel Composition containing Thiourea Functionalized Acrylic-based Co-polymer plus $VOSO_4$ | 0.0 | 0.0 | 0.5 | 1.0 | 35.0 |
| Sol-Gel Composition containing Thiazole Functionalized Acrylic-based Co-polymer plus $VOSO_4$ | 0.0 | 0.0 | 0.0 | 0.0 | 12.5 |
| Sol-Gel Composition containing Imidazole Functionalized Acrylic-based Co-polymer plus $VOSO_4$ | 0.0 | 0.0 | 0.0 | 0.5 | 21 |
| Control plus $VOSO_4$ | 0.0 | 1.0 | 3.0 | 5.0 | 55.0 |

After application, the dried-in-place coatings produced by the coating compositions of Tables 2 and 2 were largely colorless and clear. One of the issues that often arises with coating compositions for metal substrates is that exposure of a coated substrate to heat, phosphates, alkaline solutions or solvents such as methyl ethyl ketone (MEK) or ethanol can lead to a yellowing in the color of the coating. Often coated substrates are exposed to these conditions during handling, thus it is desirable to create coatings that either do not show yellowing or wherein the yellowing is reduced.

For evaluating color values of coatings, a typical color scale used in the industry is the three dimensional Hunter L, a, b color scale. This scale can be determined for a sample using a color analyzer such as the Chroma Meter CR-300 from Minolta. The value L is the lightness axis with a value of 0 equal to black and a value of 100 equal to white. The value a is the red-green axis with positive values being red, negative values being green and 0 being neutral. The value b is the yellow-blue axis with positive values being yellow, negative values being blue and 0 being neutral. Thus, in evaluating the color values of a sample before and after a test protocol if the ΔL is positive the sample is lighter than before the test protocol. If the Δa is positive the sample is more red, if negative then more green. If the Δb is positive then the sample is more yellow, if negative then more blue.

The L, a, b color difference can also be expressed as a single value, ΔE. This value defines the size of the total color difference, but does not give information about how the colors differ. The larger the ΔE the larger the color difference, it is given by the following equation:

$$\Delta E = \sqrt{(\Delta L)^2 + (\Delta a)^2 + (\Delta b)^2}.$$

For each of the below color tests, a fresh set of sol-gel coated panels were used.

Rebake Color Testing: In a first color testing protocol, panels prepared as described above were subjected to a rebake cycle of 1 hour at 240° C. for four cycles. The color values L, a, and b were measured from the panels before and after the rebake cycle testing. This test is designed to simulate conditions that can occur during processing of metal substrates. The color values were measured using a color analyzer Chroma Meter CR-300 from Minolta. The color value from the panels before and after the rebake cycle testing and the difference are presented below in Table 6.

TABLE 6

Rebake Color Test

| Coating Composition | Initial L | Initial a | Initial b | Final L | Final a | Final b | ΔL | Δa | Δb | ΔE |
|---|---|---|---|---|---|---|---|---|---|---|
| Thiourea | 77.20 | −2.11 | −0.88 | 76.33 | −2.76 | 2.85 | −0.87 | −0.65 | 3.73 | 3.88 |
| Thiourea plus VOSO$_4$ | 78.56 | −1.94 | −1.52 | 77.13 | −2.98 | 4.71 | −1.43 | −1.04 | 6.23 | 6.48 |
| Thiazole | 77.04 | −2.07 | −0.37 | 76.63 | −2.73 | 3.16 | −0.41 | −0.66 | 3.53 | 3.61 |
| Thiazole plus VOSO$_4$ | 78.93 | −1.83 | −1.69 | 77.77 | −2.95 | 3.58 | −1.16 | −1.12 | 5.27 | 5.51 |
| Imidazole | 76.67 | −2.02 | −0.50 | 76.15 | −2.85 | 3.49 | −0.52 | −0.83 | 3.99 | 4.11 |
| Imidazole plus VOSO$_4$ | 77.52 | −2.02 | −0.75 | 76.12 | −3.09 | 6.10 | −1.40 | −1.07 | 6.85 | 7.07 |
| Control | 77.64 | −1.91 | −1.04 | 77.28 | −2.71 | 2.28 | −0.36 | −0.80 | 3.32 | 3.43 |
| Control plus VOSO$_4$ | 78.82 | −1.92 | −1.03 | 76.92 | −2.76 | 3.58 | −1.90 | −0.84 | 4.61 | 5.06 |

Several trends emerge from the data. Across all coatings it can be seen that the treatment causes a shift toward yellow in the color, all of the b values are positive after treatment. There are not large differences in the effect across the various coating compositions. The presence of vanadium sulfate causes a larger yellow shift to occur across the coating compositions prepared according to the present invention with less of a shift in the control coating composition. Thus, the presence of vanadium, while it positively increases the corrosion resistance, this comes at the cost of an increase in color change associated with rebaking cycles. There is also a green shift associated with the treatment and the presence of vanadium sulfate also increases this shift. Finally, there is a darkening effect following treatment and vanadium sulfate makes this effect greater.

Alkaline Color Test: In a second color test, the test panels were subjected to the alkaline cleaner Ridoline® 336 at a 3% concentration for 3 minutes at 50° C. The cleaner is an alkaline borate cleaner available from Henkel Corporation. The color values before testing were determined and then the panels were exposed to the cleaner, rinsed and dried. Then the color values were again determined. The results are presented below in Table 7.

TABLE 7

Alkaline Color Test

| Coating Composition | Initial L | Initial a | Initial b | Final L | Final a | Final b | ΔL | Δa | Δb | ΔE |
|---|---|---|---|---|---|---|---|---|---|---|
| Thiourea | 77.20 | −2.11 | −0.88 | 77.50 | −1.29 | −1.54 | 0.30 | 0.82 | −0.66 | 1.09 |
| Thiourea plus VOSO$_4$ | 78.56 | −1.94 | −1.52 | 79.10 | −2.28 | −1.92 | 0.54 | −0.34 | −0.40 | 0.75 |

TABLE 7-continued

Alkaline Color Test

| Coating Composition | Initial L | Initial a | Initial b | Final L | Final a | Final b | ΔL | Δa | Δb | ΔE |
|---|---|---|---|---|---|---|---|---|---|---|
| Thiazole | 77.04 | −2.07 | −0.37 | 75.04 | −0.74 | −0.45 | −2.00 | 1.33 | −0.08 | 2.40 |
| Thiazole plus VOSO$_4$ | 78.93 | −1.83 | −1.69 | 79.44 | −1.29 | −0.22 | 0.51 | 0.54 | 1.47 | 1.65 |
| Imidazole | 76.67 | −2.02 | −0.50 | 77.65 | −1.61 | −1.98 | 0.98 | 0.41 | −1.48 | 1.82 |
| Imidazole plus VOSO$_4$ | 77.52 | −2.02 | −0.75 | 77.96 | −1.35 | −0.07 | 0.44 | 0.67 | 0.68 | 1.05 |
| Control | 77.64 | −1.91 | −1.04 | 74.50 | −2.04 | −1.10 | −3.14 | −0.13 | −0.06 | 3.14 |
| Control plus VOSO$_4$ | 78.82 | −1.92 | −1.03 | 78.11 | −1.11 | −0.67 | −0.71 | 0.81 | 0.36 | 1.14 |

Under these conditions the treatment causes a shift toward blue in the absence of vanadium sulfate with some differences between the coating compositions. The control sol-gel coating composition and the thiazole functionalized acrylic-based co-polymer comprising sol-gel coating compositions are the least affected. In the presence of vanadium sulfate there is a general shift toward yellow except for the thiourea coating composition which still has a shift toward blue although less than in the absence of vanadium sulfate. The treatment also generally causes a lightening of the overall color except in the control composition in the absence of vanadium sulfate. There is also some tendency toward a red shift in the treated samples.

Zinc Phosphating Color Testing: In a next color test, the panels were exposed to a zinc phosphating conversion coating solution at 40° C. for 3.5 minutes, then rinsed and dried. The color values before and after treatment were measured and the values are reported in Table 8 below.

TABLE 8

Zinc Phosphating Color Test

| Coating Composition | Initial L | Initial a | Initial b | Final L | Final a | Final b | ΔL | Δa | Δb | ΔE |
|---|---|---|---|---|---|---|---|---|---|---|
| Thiourea | 77.43 | −1.77 | −2.40 | 75.86 | −2.24 | −1.36 | −5.00 | −0.06 | 2.56 | 5.62 |
| Thiourea plus VOSO$_4$ | 78.55 | −1.42 | −2.30 | 76.82 | −1.12 | 0.12 | −1.73 | 0.30 | 2.42 | 2.99 |
| Thiazole | 77.89 | −2.93 | −1.60 | 74.21 | −3.24 | 0.89 | −3.68 | −0.31 | 2.49 | 4.45 |
| Thiazole plus VOSO$_4$ | 78.72 | −1.41 | −1.92 | 78.46 | −1.20 | −2.75 | −0.26 | 0.21 | −0.83 | 0.89 |
| Imidazole | 77.50 | −2.58 | −1.90 | 74.30 | −2.96 | 0.29 | −3.20 | −0.38 | 2.19 | 3.90 |
| Imidazole plus VOSO$_4$ | 77.06 | −2.09 | −1.51 | 75.11 | −1.74 | −0.04 | −1.95 | 0.35 | 1.47 | 2.47 |
| Control | 78.36 | −2.85 | −1.23 | 73.79 | −3.06 | 1.96 | −4.57 | −0.21 | 3.19 | 5.58 |
| Control plus VOSO$_4$ | 78.03 | −2.74 | −1.95 | 74.25 | −3.68 | 0.40 | −3.78 | −0.94 | 2.35 | 4.55 |

The results of this treatment are more mixed and do not follow the previous trends. In the absence of vanadium sulfate there was a shift toward yellow in all the coating compositions except the thiourea functionalized acrylic-based co-polymer comprising sol-gel coating composition. The effect was greatest in the control coating composition. In this test the vanadium sulfate actually reduced the yellow color shift compared to coatings without vanadium. Again the coating compositions according to the present invention cause less yellow color shift that the control sol-gel coatings.

MEK Color Testing: In a next color test, the effect of the solvent methyl ethyl ketone (MEK) on the color was tested. The panels were initially color measured and then subjected to 20 forward and backward rubs with a cloth saturated with MEK at a 1 kilogram load of pressure on the cloth. The samples were rinsed, dried and the color changes measured. The results are presented below in Table 9.

TABLE 9

MEK Color Test

| Coating Composition | Initial L | Initial a | Initial b | Final L | Final a | Final b | ΔL | Δa | Δb | ΔE |
|---|---|---|---|---|---|---|---|---|---|---|
| Thiourea | 77.20 | −2.11 | −0.88 | 78.32 | −2.28 | −1.90 | 1.12 | −0.17 | −1.02 | 1.52 |
| Thiourea plus VOSO$_4$ | 78.56 | −1.94 | −1.52 | 77.99 | −2.01 | −1.88 | −0.57 | −0.07 | −0.36 | 0.68 |
| Thiazole | 77.04 | −2.07 | −0.37 | 77.82 | −1.97 | −1.88 | 0.78 | 0.10 | −1.51 | 1.70 |
| Thiazole plus VOSO$_4$ | 78.93 | −1.83 | −1.69 | 78.78 | −2.13 | −2.19 | −0.15 | −0.30 | −0.50 | 0.60 |
| Imidazole | 76.67 | −2.02 | −0.50 | 77.86 | −1.91 | −1.23 | 1.19 | 0.11 | −0.73 | 1.40 |

TABLE 9-continued

MEK Color Test

| Coating Composition | Initial L | Initial a | Initial b | Final L | Final a | Final b | ΔL | Δa | Δb | ΔE |
|---|---|---|---|---|---|---|---|---|---|---|
| Imidazole plus VOSO$_4$ | 77.52 | −2.02 | −0.75 | 76.27 | −1.72 | −1.51 | −1.25 | 0.30 | −0.76 | 1.49 |
| Control | 77.64 | −1.91 | −1.04 | 77.51 | −2.14 | −1.89 | −0.13 | −0.23 | −0.85 | 0.89 |
| Control plus VOSO$_4$ | 78.82 | −1.92 | −1.03 | 77.54 | −2.06 | −1.90 | −1.28 | −0.14 | −0.87 | 1.55 |

In the absence of vanadium sulfate there was a shift toward blue and the presence of vanadium sulfate reduced this shift toward blue. The overall color changes were small.

Ethanol Color Testing: In a next color test the effect of a 80% solution of ethanol in deionized water on the color was tested. The panels were initially color measured and then subjected to 20 forward and backward rubs with a cloth saturated with a 80% ethanol solution at a 1 kilogram load of pressure on the cloth. The samples were rinsed, dried and the color changes measured. The results are presented below in Table 10.

TABLE 10

Ethanol Color Test

| Coating Composition | Initial L | Initial a | Initial b | Final L | Final a | Final b | ΔL | Δa | Δb | ΔE |
|---|---|---|---|---|---|---|---|---|---|---|
| Thiourea | 77.20 | −2.11 | −0.88 | 78.16 | −2.04 | −1.41 | 0.96 | 0.07 | −0.53 | 1.10 |
| Thiourea plus VOSO$_4$ | 78.56 | −1.94 | −1.52 | 79.70 | −1.99 | −1.85 | 1.14 | −0.05 | −0.33 | 1.19 |
| Thiazole | 77.04 | −2.07 | −0.37 | 78.67 | −2.09 | −1.02 | 1.63 | −0.02 | −0.65 | 1.75 |
| Thiazole plus VOSO$_4$ | 78.93 | −1.83 | −1.69 | 79.65 | −2.12 | −1.80 | 0.72 | −0.29 | −0.11 | 0.78 |
| Imidazole | 76.67 | −2.02 | −0.50 | 78.40 | −2.04 | −1.25 | 1.73 | −0.02 | −0.75 | 1.89 |
| Imidazole plus VOSO$_4$ | 77.52 | −2.02 | −0.75 | 78.41 | −1.96 | −1.07 | 0.89 | 0.06 | −0.32 | 0.95 |
| Control | 77.64 | −1.91 | −1.04 | 78.28 | −2.08 | −1.31 | 0.64 | −0.17 | −0.27 | 0.72 |
| Control plus VOSO$_4$ | 78.82 | −1.92 | −1.03 | 79.17 | −2.00 | −1.41 | 0.35 | −0.08 | −0.38 | 0.52 |

In the absence of vanadium sulfate there was a shift toward blue and the presence of vanadium sulfate reduced this shift toward blue. The overall color changes were small.

Overall, color performance testing showed sufficient resistance to yellowing of the coatings, compared to the control despite addition of the acrylic-based co-polymer comprising nitrogen-containing functional groups to improve corrosion resistance.

The present invention provides a new series of sol-gel compositions containing an acrylic-based co-polymer comprising nitrogen-containing functional groups that find use as anti-corrosion protection coatings. The sol-gel comprises a mixture of silanol precursors in addition to a co-polymer that is acrylic-based and includes a nitrogen-containing organic functional group, preferably selected from thioureas, thiazoles, and imidazoles. The preferred functional groups are N-allyl-thiourea, 4-methyl-5-vinylthiazole and 1-vinyl-imidazole. The sol-gel also can include vanadium sulfate or other corrosion inhibitors to enhance corrosion protection in addition to surfactants.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A sol-gel coating composition comprising:
   a) one or more silane hydrolysis promoting acids;
   b) at least one silanol precursor; and
   c) 10 to 35% by weight of an acrylic-based co-polymer formed by copolymerization of a combination of monomers consisting of a monomer bearing a nitrogen-containing organic functional group and one or more co-monomers and comprising nitrogen-containing organic functional groups, based on a total weight of the sol-gel composition excluding water and solvents, wherein the acrylic-based co-polymer has a glass transition temperature of from 0 to 50° C.;
   wherein the nitrogen-containing organic functional groups are selected from the group consisting of thiourea, thiazole and combinations thereof;
   and
   wherein the co-monomers co-polymerized with the monomer bearing a nitrogen-containing organic group to form the acrylic-based co-polymer are selected from the group consisting of methyl methacrylate, 2-ethylhexyl acrylate, n-butyl methacrylate, butyl acrylate, styrene, alpha-methylstyrene, acrylamide, acrylonitrile, methacrylonitrile, methylenebutyrolactone, vinylpyrrolidone, vinyl acetate and combinations thereof.

2. The sol-gel coating composition of claim 1 further comprising a source of vanadium.

3. The sol-gel coating composition of claim 1 wherein the nitrogen-containing organic functional groups are present in an amount of about 0.5-15% by weight based on a total weight of the acrylic-based co-polymer on a dry-solids basis.

4. The sol-gel coating composition of claim 1 wherein the at least one silanol precursor comprises at least one of tetraethylorthosilicate, methyltriethoxysilane, 3-glycidyloxypropyltriethoxysilane, and aminoethylaminopropyltrimethoxysilane.

5. The sol-gel coating composition of claim 1 wherein the sol-gel coating composition further comprises a surfactant and the co-monomers co-polymerized to form the acrylic-based co-polymer are selected from the group consisting of n-butyl methacrylate, styrene, methyl methacrylate, 2 ethylhexyl acrylate and combinations thereof.

6. The sol-gel coating composition of claim 1, wherein the monomer bearing a nitrogen-containing organic functional group is selected from the group consisting of N-allyl thiourea and 4-methyl-5-vinylthiazole and the co-monomers co-polymerized with the monomer bearing a nitrogen-containing organic group to form the acrylic-based co-polymer are a combination of methyl methacrylate, 2-ethylhexyl acrylate, n-butyl methacrylate and styrene.

7. A coated metal substrate comprising:
a. at least one metal surface;
b. deposited on and chemically adhered to said at least one metal surface an organic-inorganic composite coating comprising reaction products of the composition of claim 1 with the metal surface and products of condensation of the sol-gel.

8. The coated metal substrate according to claim 7, wherein the organic-inorganic composite coating on the coated metal substrate further comprises vanadium.

9. An article of manufacture comprising the coated metal substrate according to claim 7, said article of manufacture being selected from a component of a vehicle, an architectural element, a household appliance and an electronic device.

10. The coated metal substrate according to claim 7, wherein said at least one metal surface comprises galvanized metal.

11. A coated metal substrate comprising:
a. a metal substrate having at least one metal surface comprising aluminum or an alloy thereof, at least a portion of said surface comprising a metal oxide chemically adhered thereto;
b. deposited on and chemically adhered to said metal substrate an organic-inorganic composite coating comprising products of condensation of the sol-gel composition of claim 1.

12. The coated metal substrate according to claim 11, wherein the organic-inorganic composite coating comprises reaction products of said sol-gel composition with one or more of the metal surface and the metal oxide.

13. The coated metal substrate according to claim 11, wherein said metal oxide comprises titanium dioxide and/or zirconium dioxide.

14. A method of coating a metal surface comprising:
a. optionally, cleaning a metal substrate having at least one metal surface, at least a portion of said surface optionally comprising a metal oxide chemically adhered thereto;
b. contacting the at least one metal surface with a sol-gel coating composition according to claim 1;
c. drying said sol-gel coating composition in place on the at least one metal surface, such that the sol-gel coating composition reacts with said metal surface thereby forming a chemically adhered organic-inorganic composite coating on the metal surface, the organic-inorganic composite coating comprising silicon-based polymer chains and acrylic-based polymer chains.

15. The method of coating a metal surface according to claim 14, wherein the sol-gel coating composition is applied in a continuous process.

16. The method of coating a metal surface according to claim 14, wherein the contacting step immediately follows a galvanizing treatment and the metal surface being contacted comprises galvanized metal.

17. The method of coating a metal surface according to claim 14, wherein the metal oxide is present on the metal substrate, said metal substrate comprising aluminum or an alloy thereof and said metal oxide comprising titanium dioxide and/or zirconium dioxide.

18. The method of coating a metal surface according to claim 14, wherein during at least a portion of drying step c., the metal surface has a peak metal temperature ranging from about 40° C. to about 150° C.

19. A sol-gel coating composition comprising:
a) one or more silane hydrolysis promoting acids;
b) at least one silanol precursor; and
c) 10 to 35% by weight of an acrylic-based co-polymer comprising nitrogen-containing organic functional groups, based on a total weight of the sol-gel composition excluding the weight of water and solvents, wherein the nitrogen-containing organic functional groups comprise thiourea and the nitrogen-containing organic functional groups are present in an amount of 2 to 6% by weight based on a total weight of the acrylic-based co-polymer on a dry-solids basis wherein the acrylic-based co-polymer has a glass transition temperature of from 0 to 50° C.

20. The sol-gel coating composition of claim 19 further comprising a source of vanadium.

21. The sol-gel coating composition of claim 19 wherein the nitrogen-containing organic functional groups further comprise one or more of a thiazole and an imidazole.

22. The sol-gel coating composition of claim 19 wherein the at least one silanol precursor is selected from the group consisting of silicic acid esters, alkylalkoxysilanes, and organofunctionalsilanes.

23. A sol-gel coating composition consisting of:
a) one or more silane hydrolysis promoting inorganic acids;
b) about 55 to about 85 wt % of at least one silanol precursor, based on a total weight of the sol-gel coating composition excluding the weight of water and solvents;
c) 10 to 35% by weight of an acrylic-based co-polymer comprising nitrogen-containing organic functional groups, based on a total weight of the sol-gel coating composition excluding the weight of water and solvents wherein the nitrogen-containing organic functional groups are selected from the group consisting of thiourea, thiazole and combinations thereof, and wherein the acrylic-based co-polymer has a glass transition temperature of from 0 to 50° C.;
d) optional vanadium containing compounds and/or inorganic nanoparticles; and
e) optionally, other materials selected from the group consisting of additional polymer dispersions or emulsions, surfactants, co-solvents, molybdates, chromium compounds and combinations thereof.

24. The sol-gel coating composition of claim 23 wherein:
a) is phosphoric acid; b) is selected from aminoethylaminopropyltrimethoxysilane, tetraethoxy silane, methyl triethoxysilane, 3-glycidyloxypropyltriethoxysilane and combinations thereof; the nitrogen-containing organic functional groups of c) are selected from thiazole and thiourea; d) is present as vanadium sulfate; and e) is present as surfactant.

25. The sol-gel coating composition of claim 23 wherein: monomers and co-monomers co-polymerized to form c) the acrylic-based co-polymer are selected from the group consisting of methacrylate ester monomers, acrylate ester monomers, methyl methacrylate, 2-ethylhexyl acrylate, n-butyl methacrylate, butyl acrylate, styrene, alpha-methylstyrene, acrylamide, acrylonitrile, methacrylonitrile, methylenebutyrolactone, vinylpyrrolidone, chloroprene, vinyl acetate and combinations thereof.

26. The sol-gel coating composition of claim 23 wherein the wherein the nitrogen-containing organic functional groups are organic functional groups comprising a nitrogen atom and a sulfur atom.

27. The sol-gel coating composition of claim 23 wherein the nitrogen-containing organic functional groups comprise one or more of a thiourea and a thiazole.

28. The sol-gel coating composition of claim 23 wherein the nitrogen-containing organic functional groups are present on the acrylic-based co-polymer in an amount of 1-10% by weight based on a total weight of the nitrogen-containing organic functional group relative to a total weight of the acrylic-based co-polymer on a dry solids basis.

* * * * *